United States Patent [19]

Schneemann

[11] Patent Number: 4,606,244

[45] Date of Patent: Aug. 19, 1986

[54] INDEXING TURNTABLE ASSEMBLY

[76] Inventor: Anthony K. Schneemann, 25761 Briarbank, Southfield, Mich. 48034

[21] Appl. No.: 511,745

[22] Filed: Jul. 7, 1983

[51] Int. Cl.[4] .......................................... B23Q 17/00
[52] U.S. Cl. ......................................... 74/816; 74/822
[58] Field of Search ................. 74/822, 813 C, 813 L, 74/138, 152, 154, 126

[56] References Cited

U.S. PATENT DOCUMENTS

| | | | |
|---|---|---|---|
| 2,660,895 | 12/1953 | Waters | 74/822 |
| 2,968,973 | 1/1961 | Mead | 74/822 |
| 3,383,955 | 5/1968 | Schneeman | 74/822 |
| 3,440,905 | 4/1969 | Tomiyama | 74/822 |

*Primary Examiner*—Gary L. Smith
*Assistant Examiner*—Vinh Luong
*Attorney, Agent, or Firm*—Krass and Young

[57] ABSTRACT

A workpiece indexing assembly which causes incremental rotation of a turntable from one work station position to another being actuated by a linearly translating driver. The mechanism includes an indexing hub having a number of radially spaced notches, a one-way clutch dog, a locking pawl and a driving dog. Upon retraction of the driver the driving dog becomes disengaged from one notch and is rotated until engagement occurs with another notch. Retraction also causes disengagement of the locking pawl. Rotation of the table is prevented during retraction by the one-way clutch. Upon extension of the actuator, the one-way clutch allows rotation. When the next work station position is reached, the locking pawl and the one-way clutch are reseated into hub notches. The driver is connected to the driving dog by a link featuring overcenter travel to insure firm locking of the turntable at a work station position.

8 Claims, 6 Drawing Figures

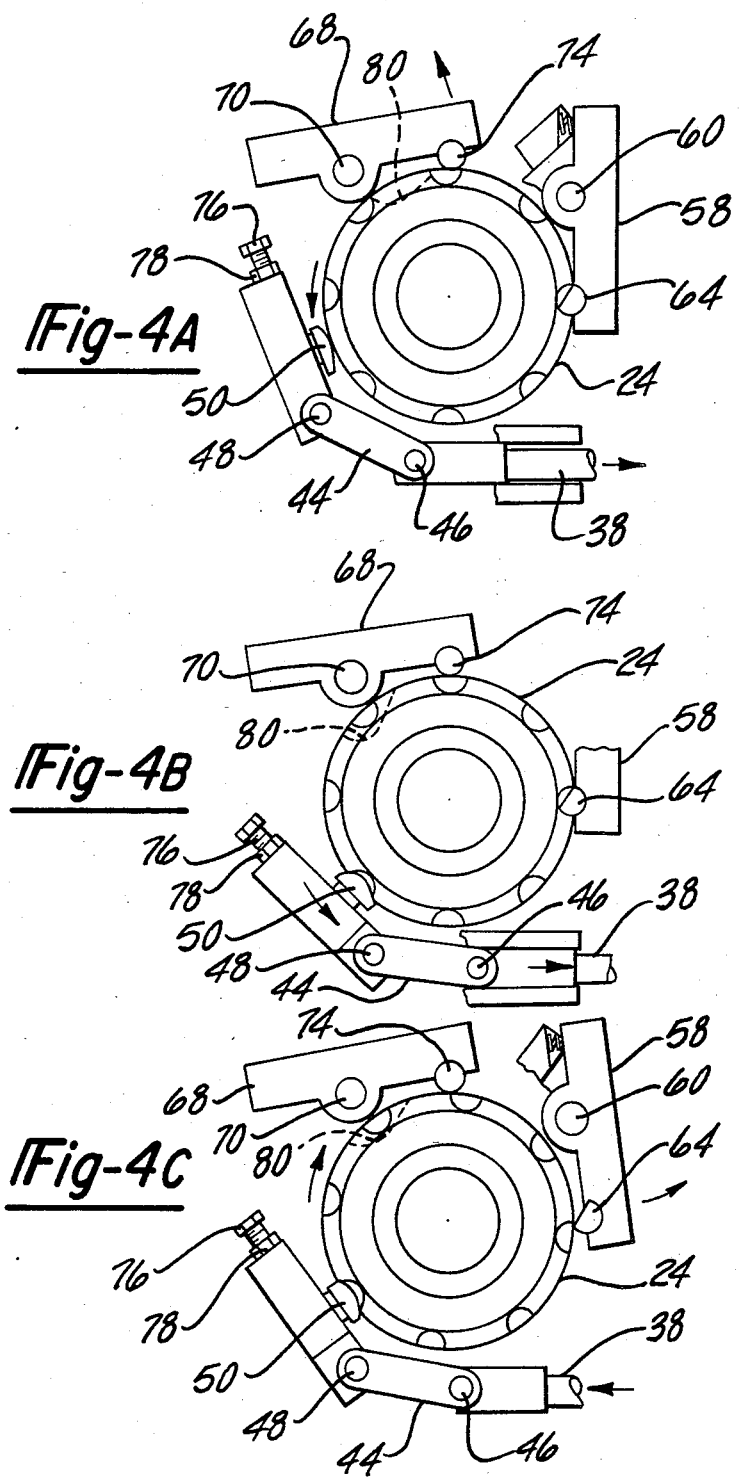

INDEXING TURNTABLE ASSEMBLY

BACKGROUND OF THE INVENTION

This invention relates to an indexing turntable assembly and more particularly to a rotary workpiece table for moving a table from one angular work station position to another which table is locked at each station. It is frequently necessary in industry to employ an indexing turntable which positions workpieces at various work stations where a specified machining, assembly, treatment or positioning step is completed. Since ordinarily external forces are applied to the workpiece at the work stations, the turntable must be securely locked into position. In addition, the indexed positions of the workpiece must be held within close tolerances since ordinarily the external tool or device does not sense the workpiece positions and therefore a predetermined workpiece position must be accurately maintained by the turntable. U.S. Pat. No. 3,383,955 issued to this inventor also relates to an indexing mechanism. That patent however, does not teach or suggest the invention disclosed herein.

SUMMARY OF THE INVENTION

This invention is embodied in an indexing turntable assembly which achieves the above-mentioned objectives and is further highly reliable and of relatively simple construction. The turntable is caused to index from one work station position to another through actuation by a translating member such as the piston rod of a conventional pneumatic cylinder. For the sake of explanation, the translating member is assumed to be a pneumatic cylinder which moves from a normal extended position to a retracted position. The turntable is affixed to an indexing hub having a plurality of equally radially spaced notches formed by a peripheral flange. The turntable and indexing hub are rotatably mounted by a spindle affixed to a mounting plate. A spring biased one-way clutching dog engages one of the notches when the indexing hub is at a work station position yet permits rotation of the hub from one work station to the next. Indexing hub rotation results from the angular reciprocating action of an indexing yoke about the spindle which yoke is connected to the translating actuation member by a link such that retraction of the actuation member cause a predetermined angular rotation of the yoke in one angular direction whereas extention causes the yoke to return to its original position through rotation in the opposite direction. The yoke includes a one-way driving dog which disengages an indexing hub notch upon retraction and is moved into registry with and engages the next notch to drive the hub to the next work station position upon actuation member extension. The indexing hub is locking in an indexed position by a locking pawl which engages an indexing hub notch when the translating actuation member is extended. The angular position of the link with respect to the actuating member and indexing yoke is such that a toggle action results upon actuation member extension whereby the locking pawl is securely positioned and cannot be dislodged absent mechanical failure of a component making the lock quite secure. The above mentioned toggle action provides an additional advantage in that the angular velocity of the indexing table as it moves from one indexed position to the next decreases as the table approaches an indexed position.

Additional benefits and advantages of the present invention will become apparent to those skilled in the art to which their invention relates upon a reading of the description of the described preferred embodiments of this invention taken in conjunction with the accompanying drawings.

DESCRIPTION OF THE DRAWINGS

FIG. 4A is a partial top view of the indexing table mechanism showing the relationship of components at the initiation of actuation member retraction.

FIG. 4B is a partial top view of the indexing table mechanism showing the relationship of components at the fully retracted position of the actuation member.

FIG. 4C is a partial top view of the indexing table mechanism showing the relationship of components as the table is being rotated to a new work station position.

DETAILED DESCRIPTION OF THE INVENTION

Figure 1:
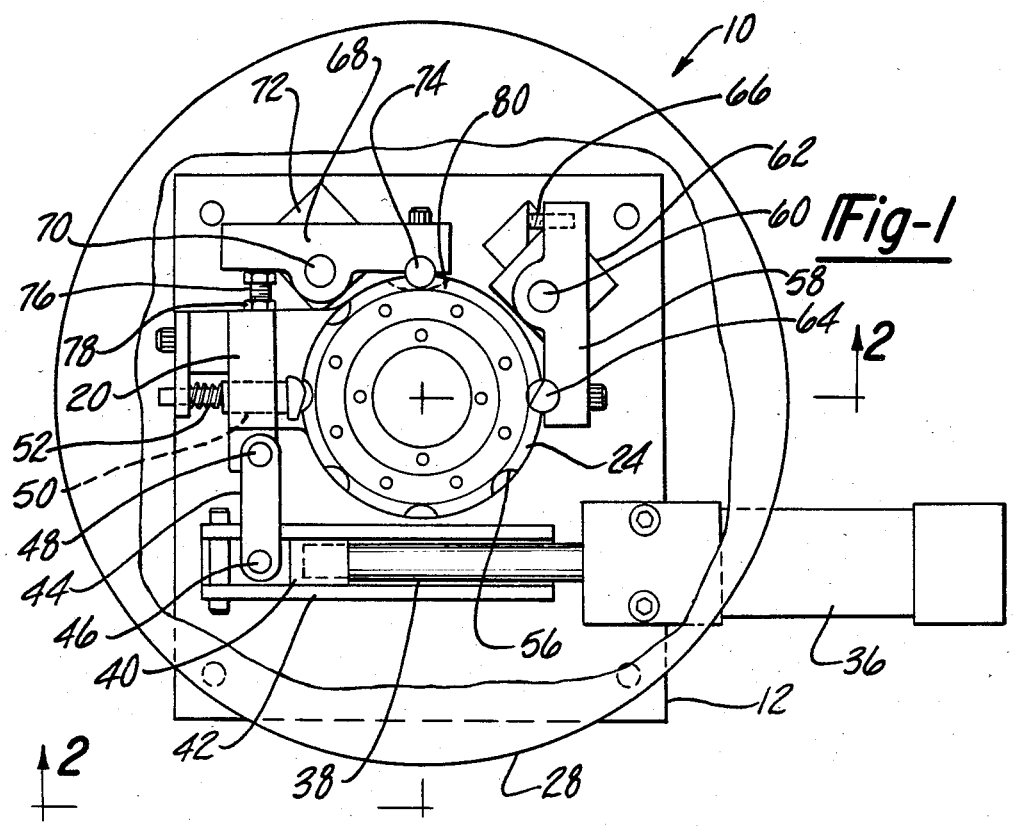
FIG. 1 is a top view of an indexing table embodying this invention with the turntable partially cut away to reveal the underlying structure.

An indexing table according to this invention is shown by each of the Figures and is generally designated by reference character 10.

Figure 2:
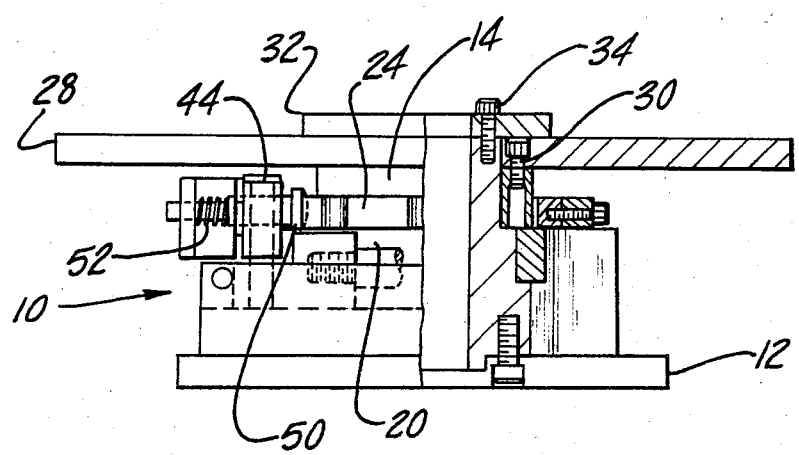
FIG. 2 is a partial side view and section taken along line 2—2 of FIG. 1.
Figure 3:
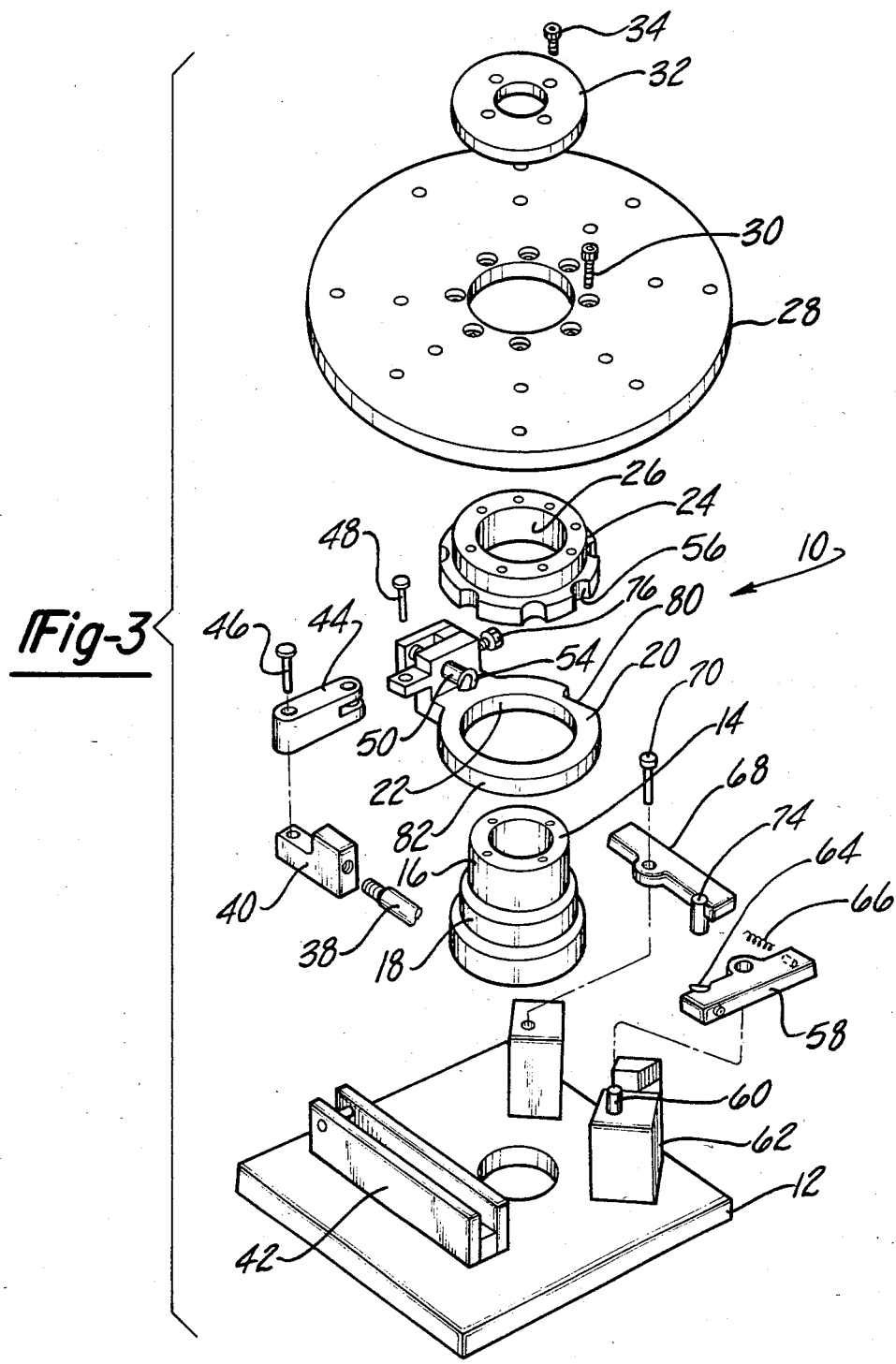
FIG. 3 is an exploded pictorial view of the indexing table according to this invention.

With specific reference to FIGS. 1, 2 and 3, mounting plate 12 is affixed nonrotatable spindle 14. Spindle 14 forms a first diameter section 16 and second diameter section 18. Indexing yoke 20 includes an internal diameter 22 sufficient to be closely received by spindle second diameter section 18 and rotatable thereon. Indexing hub 24 forms internal diameter 26 which slidably overfits spindle first diameter section 16 and is rotatable thereon. Spindle second diameter section 18 has sufficient axial height to provide clearance between yoke 20 and indexing hub 24 such that they may be rotated independantly. Turntable 28 is a large diameter flat circular plate mounted to indexing hub 24 by a plurality of bolts 30. Spindle plate 32 is mounted to spindle 14 by bolts 34 and traps turntable 28 such that it cannot be removed. For the reason that spindle 14 must be free to rotate, spindle first diameter section 16 must have sufficient axial height to prevent interference between turntable 28 and nonrotatable spindle plate 32.

Actuation cylinder 36 is shown as a conventional pneumatic cylinder which may be actuated to cause extension and retraction of cylinder rod 38 in a manner well known in the art. Actuation cylinder 36 could alternately be mounted below mounting plate 12 in which case movement of cylinder rod 38 would be communicated to link 44 through a modified rod slider which would translate along a slot in the mounting plate (not shown). Moreover, it is well within the scope of this invention to employ any one of numerous types of linearly translating actuating means including by way of illustration a hydraulic cylinder, solenoid or a gear drive powered by a pneumatic, hydraulic or an electric motor. In the illustrated embodiment, rod 38 is fast to a rod slider 40 which is restrained to translatory movement within rod slider track 42. Link 44 is hinged to rod slider 40 by first link pivot pin 46 which permits relative rotation therebetween. Link 44 is also hinged to indexing yoke 20 by second link pivot pin 48. By this arrangement, upon retraction of cylinder rod 38 yoke 20 moves in a counterclockwise direction in the illustrated embodiment about spindle 14 whereas yoke 20 moves clockwise upon cylinder rod 38 extension. Reference to cylinder 38 extension and retraction is used by way of illustration, a cylinder or other actuation means could be employed such that retraction would produce the same effect as extension of cylinder 38 and vice versa. Driving dog 50 is a plunger member biased toward spindle 14 by helical coil spring 52. Driving dog 50 is restrained by yoke 20 to move along a radial path with respect to spindle 14. Dog 50 further forms head portion 54 which includes a sloped surface which engages one of the plurality of equally radially spaced semicircular notches 56 formed by indexing hub 24. The sloped surface of driving dog head causes driving dog 50 to disengage notch 56 when yoke 20 is moved counterclockwise yet engages a notch 56 when driven clockwise and positioned in registry with a notch.

One-way clutch dog lever 58 is rotatably mounted to post 62 by pivot 60. Clutch dog 64 has a circular cross section evident with reference to FIG. 1 which circular section is skived to form a ramp. Dog 64 is biased toward spindle 14 by spring 66. The interaction between the skived portion of dog 64 and hub 24 causes the dog to be retracted from notch 56 when the hub is driven clockwise. However, dog 64 prevents counterclockwise rotation of hub 24.

Locking pawl lever 68 is rotatably supported on post 72 by pivot pin 70. Locking pawl 74 has a circular cross section which engages a notch 56. Lock bolt 76 is threaded into yoke 20 and held in a desired extended length by locknut 78. When indexing turntable assembly 10 is in the locked position, lockbolt 76 acts on locking pawl lever 68 to force locking pawl 74 firmly in position within a notch 56. Cam surface 80 formed by indexing yoke outer diameter 82 acts to urge locking pawl 74 from its seated position within notch 56 when yoke 20 is rotated counterclockwise.

Indexing turntable assembly 10 is configured such that driving dog 50, locking pawl 74 and clutch dog 64 each seat within one of notches 56 when turntable 28 is at an indexed position. It is well within the capability of those skilled in the art to which this invention relates to provide a number of notches different than that shown by the illustration to achieve any desired amount of turntable angular rotation between work station positions.

Operation of the indexing turntable assembly according to this invention is best explained with reference to FIGS. 4A, 4B and 4C. FIG. 4A depicts the relationship among components early in the actuation cylinder 36 retraction cycle. Yoke 20 is moved counterclockwise as indicated by the arrow through tension on link 44 as cylinder rod 38 is retracted. Since one-way clutch dog 64 prevents indexing hub 24 from rotating in a counterclockwise direction, driving dog 50 is caused to retract to permit hub rotation. As yoke 20 is rotated in a counterclockwise direction, lock bolt 76 becomes separated from locking pawl lever 68 enabling locking pawl 74 to be withdrawn from a notch 56, which withdrawl is further aided by indexing yoke cam surface 80.

FIG. 4B depicts the relationship of components when cylinder rod 38 is fully retracted. In this position, driving dog 50 engages the next notch 56 which is angularly separated from the notch previously engaged by the desired angular movement between work stations. One-way clutch dog 64 remains engaged and locking pawl 74 remains disengaged as discussed in connection with FIG. 4A.

FIG. 4C shows the indexing hub being driven to a new work station position. Extension of cylinder rod 38 drives yoke 20 and driving dog 50 in a clockwise position. The skived portion of one-way clutch dog 64 causes the dog to retract and disengage notch 56 thereby permitting hub 24 rotation.

The latched position of indexing turntable assembly 10 is illustrated by FIG. 1. As hub 24 moves to a new work station position, one-way clutch dog 64 is in registry with and engages another notch 50 and locking pawl 74 is forced by lock bolt 76 into a locked position.

At the initiation of turntable 28 rotation, as shown in FIG. 4C, an incremental amount of cylinder rod 38 extension causes a greater amount of angular rotation than exists when the rod is near full extention, as shown in FIG. 1. This results occurs due to the changing angular relationship between the direction of movement of cylinder rod 38 and link 44. In fact, at near full rod 38 extension there is no theoretical hub 24 rotation. This "overcenter" or "toggle clamp" action results in a latching action of rod 38 whereby external forces exerted on turntable 28 do not result in rod retraction. This toggle action also results in smooth angular deceleration of turntable 28 since a uniform velocity of cylinder rod 38 extension results in decreasing turntable angular velocity as the rod approaches a fully extended position.

While preferred embodiments of the invention have been described herein, it will be appreciated that various modifications and changes may be made without departing from the spirit and scope of the appended claims.

I claim:

1. An indexing turntable assembly for causing rotation of a turntable to a plurality of work station positions comprising:
   a spindle;
   an indexing hub rotatably mounted to said spindle and defining a plurality of circumferentially spaced notches;
   an indexing yoke rotatably mounted to said spindle;
   actuation means causing said indexing yoke to angularly reciprocate between an indexed and a retracted position;
   a driving dog affixed to said yoke and biased to engage with a first one of said notches when said yoke is in its indexed position and disengage from that notch when said indexing yoke is moved from its indexed position to its retracted position whereupon said driving dog engages another of said notches for driving said indexing hub to a new indexed position;
   a one-way clutch dog engaging a second one of said notches, spaced circumferentially from said first notch, when said yoke is in its indexed position and operative to prevent rotation of said indexing hub when said indexing yoke is moved from its indexed position to its retracted position, said clutch dog allowing rotation of said indexing hub when said indexing yoke is moved from its retracted to its indexed position; and
   a locking pawl assembly including a locking pawl engaging a third one of said notches, spaced circumferentially from said first and second notches, when said yoke is in its indexed position and movable out of engagement with said hub as said hub is driven to a new indexed position by said yoke.

2. The indexing turntable assembly according to claim 1 wherein, said actuating means comprises a pneumatic cylinder having a translating rod rotatably connected to a first end of a rigid link, a second end of said rigid link being rotatably attached to said indexing yoke.

3. The indexing turntable assembly according to claim 2 wherein upon translation of said pneumatic cylinder rod, an axis drawn between said link first and second ends forms a right angle with the direction of translation of said rod.

4. An indexing turntable assembly according to claim 1 wherein said turntable assembly further includes co-acting means on said yoke and on said locking pawl assembly operative to maintain said locking pawl in engagement with said third notch when said yoke is in its indexed position and operative to allow movement of said locking pawl out of engagement with said third notch as said yoke moves to its retracted position.

5. The indexing turntable assembly according to claim 4 wherein said coacting means comprises a locking pawl lever having a first and second end and a pivot spaced therebetween with said first end supporting said locking pawl and said second end contacting said indexing yoke when said yoke is in its indexed position.

6. The indexing turntable assembly according to claim 5 wherein said indexing yoke further forms a cam surface which urges said locking pawl from engagement with said third notch when said yoke is moved from its indexed position to its retracted position.

7. In an indexing turntable assembly for causing rotation of a turntable to a plurality of work station positions including an angularly reciprocating indexing yoke having a driving dog which engages a plurality of notches formed by a hub, drive means acting on said yoke moving said yoke from an indexed position wherein said driving dog engages a first one of said notches to a retracted position wherein said driving dog engages another of said notches whereupon said hub is caused to rotate as said yoke is returned to its indexed position, and one-way clutch dog means engageable with a second one of said notches spaced circumferentially from said first notch, when said yoke is in its indexed position, the improvement wherein said assembly further includes;

a lever having a first and second end and a pivot therebetween, a locking pawl affixed to said first end and engageable with a third of said notches, spaced circumferentially from said first and second notches, when said yoke is in its indexed position and means on said indexing yoke contacting said second end of said lever when said yoke is in its indexed position whereby said locking pawl is locked into position within said third notch to thereby coact with said driving dog and said one-way clutch dog to prevent rotation of said turntable.

8. In an indexing turntable assembly for causing rotation of a turntable to a plurality of work stations including an angularly reciprocating indexing yoke having a driving dog, drive means acting on said yoke, said yoke moveable between a first position wherein said driving dog engages a first notch formed by a hub to a second position wherein said driving dog engages another notch whereupon said hub is rotatably driven when said yoke is returned to said first position, one-way clutch dog means engageable with a second notch, spaced circumferentially from said first notch, and a locking pawl means engageable with a third notch, spaced circumferentially from said first and second notches, the improvement wherein said drive means comprises;

a linearly translating actuation means pivotably affixed to a rigid link having a first and second end, said first end being pivotably affixed to said actuation means, said second link end being pivotably affixed to said indexing yoke such that a line passing through said first and second link ends forms a right angle with respect to the direction of movement of said linearly translating actuation means when said indexing yoke is at or near said first position.

* * * * *